Patented Oct. 3, 1933

1,929,003

UNITED STATES PATENT OFFICE 1,929,003

PROCESS FOR PREPARING PROTEINASES AND CARBOXY-POLYPEPTIDASES OF THE PANCREAS

Wilhelm Neugebauer, Wiesbaden-Biebrich, Germany, assignor to Kalle & Co. Aktiengesellschaft, Wiesbaden-Biebrich, Germany No Drawing. Application November 24, 1930, Serial No. 497,959, and in Germany December 9, 1929

10 Claims. (Cl. 167—73)

The present invention relates to a process for separating proteinases and carboxy-polypeptidases of the pancreas.

Trypsin consists of a mixture of two proteases, i. e. of a proper enzyme resolving protein (proteinase) and of an enzyme resolving polypeptide. The latter enzyme differs from the peptidases of erepsine in that it affects only such polypeptide chains as contain a free carboxyl group, whereas the other known peptidases only resolve peptides having a free amino group. The polypeptidases of the trypsin has, therefore, been denoted as carboxy-polypeptidase.

The proteinase contained in the trypsin can be separated from the carboxy-polypeptidase by adsorption by means of special kinds of aluminium oxide. The success of the separation depends entirely on the correct manufacture of the alumina preparation. This method of separation, however, always entails considerable losses of enzyme and it can, therefore, not be utilized for a process on a technical scale.

Now I have found that the proteinases and carboxy-polypeptidases of the pancreas can be separated by the employment of a process based on their different solubilities, inasmuch as the proteinases are generally more easily soluble than the carboxy-polypeptidases. For the separation in this manner water-soluble organic solvents which are precipitants for enzymes as, for instance, acetone or alcohols are employed. When using acetone and alcohols, a concentration of about 50% is the most suitable one for the separation. The process can be carried out by mixing the enzyme solutions with the precipitating agents until the concentration desired is attained. It may, however, also be carried out by extracting solid mixtures of enzymes with solutions of the concentration indicated. The solutions become thereby richer in proteinase, whereas the carboxy-polypeptidase is contained in the precipitates or in the undissolved residues. By suitably altering the concentration of the mother liquors containing proteinase, for instance by addition of known precipitating agents, such as acetone, alcohols, or by adopting other suitable measures, such as cautious drying, the proteinase can likewise be obtained in a solid state. Under suitable conditions a considerable separation can be effected merely by a single precipitation or solution process, which separation can, if required, be further improved by repeating the process. The losses of enzymes occuring during the process are small, so that it can be carried out on a technical scale.

It is surprising that enzymes which are so closely related as the proteinases and carboxy-polypeptidases can be separated by a simple fractionated treatment with the known enzyme precipitating agents.

The individual enzymes obtainable according to the process described may be used in the pharmaceutical industry, for instance as a digestive remedy. Furthermore they may be used for industrial purposes, for instance, as leather-bate.

The following examples serve to illustrate the invention; but they are not intended to limit it thereto:

(1) A 5 per cent aqueous solution of a completely activated trypsin (the activity of which can no longer be increased by entero-kinase) is mixed with the same volume of acetone. The resultant precipitate contains about 80% of the carboxy-polypeptidase and about 15-20% of the proteinase. The precipitate is isolated by filtration or centrifugation and made into dry preparations by known processes. The main quantity of the proteinase (about 80%) is separated from the mother liquors by increasing the acetone concentration to about 70% and is isolated in the usual manner. It still contains a small quantity of the carboxy-polypeptidase. By repeating the process the separation of the enzymes may be effected still more completely.

For the purpose of analytical determination regarding the products, in the case of the proteinase, the liquefying power with regard to gelatin may be used as a test, and in the case of the carboxy-polypeptidase the degrading power of halogen-acylated aminoacids, such as chloracetyl-tyrosine or chloracetyl-phenylalanine may be employed, for instance by measuring the amino groups which are set free according to the von Slyke process.

(2) 10 parts by weight of trypsin are treated for one hour with about 100 parts by weight of acetone of 50% strength by volume. The undissolved part is then separated by filtration or centrifugation. It contains about 80% of the carboxy-polypeptidase and small quantities of proteinase. The latter is separated from the mother liquors by addition of the same quantity of acetone, the yield being about 80%.

(3) An aqueous trypsin solution is precipitated with 1.2 parts by volume of normal propyl-alcohol. The precipitate contains about 75% of the carboxy-polypeptidase. By the addition of double the quantity of normal propyl-alcohol the proteinase is obtained from the separated mother liquors the yield being about 80% and being mixed with a small quantity of carboxy-polypeptidase.

(4) A 5% aqueous solution of pancreatin is mixed with 1.1 part by volume of ethyl alcohol. The precipitate produced is filtered by suction. It contains about 70% of the carboxy-polypeptidase and about 25% of the proteinase. By increasing the alcohol concentration to about 70%, the proteinase is obtained in a yield of about 75%. It still contains a small quantity of carboxy-polypeptidase.

In the foregoing examples acetone and propyl-alcohol can be replaced by other suitable precipitating agents or extracting agents. The enzyme which has remained in solution can, instead of being separated by precipitation, also be isolated by spray-drying or other processes.

I claim:

1. The process which consists in subjecting a pancreas preparation, containing a mixture of proteinases and carboxypolypeptidases, to a fractionation with water-soluble organic solvents, which are precipitants for enzymes, and separating the water-soluble organic solvent, containing the proteinases in a dissolved state, from the carboxy-polypeptidases remaining undissolved.

2. The process which consists in subjecting an aqueous solution of a pancreas preparation, containing a mixture of proteinases and carboxy-polypeptidases, to a fractionating precipitation with water-soluble organic solvents, which are precipitants for enzymes, and separating the mixture of water and the water-soluble organic solvent, containing the proteinases in a dissolved state, from the carboxy-polypeptidases, being precipitated.

3. The process which consists in subjecting a trypsin preparation of the pancreas, containing a mixture of proteinases and carboxypolypeptidases, to a fractionation with water-soluble organic solvents, which are precipitants for enzymes, and separating the water-soluble organic solvent, containing the proteinases in a dissolved state, from the carboxypolypeptidases, remaining undissolved.

4. The process which consists in subjecting an aqueous solution of a trypsin preparation of the pancreas, containing a mixture of proteinases and carboxypolypeptidases, to a fractionating precipitation with water-soluble organic solvents known as precipitants for enzymes, and separating the mixture of water and the water-soluble organic solvent, containing the proteinases in a dissolved state, from the carboxypolypeptidases, being precipitated.

5. The process which consists in subjecting a trypsin preparation of the pancreas, containing a mixture of proteinases and carboxypolypeptidases, to a fractionation with water-soluble organic solvents of the group consisting of alcohols and acetone, which solvents are precipitants for enzymes, and separating the water-soluble organic solvent, containing the proteinases in a dissolved state, from the carboxypolypeptidases, remaining undissolved.

6. The process which consists in subjecting an aqueous solution of a trypsin preparation of the pancreas, containing a mixture of proteinases and carboxypolypeptidases, to a fractionating precipitation with water-soluble organic solvents of the group consisting of alcohols and acetone, which solvents are precipitants for enzymes, and separating the mixture of water and the water-soluble organic solvent, containing the proteinases in a dissolved state, from the carboxypolypeptidases, being precipitated.

7. The process which consists in subjecting a trypsin preparation of the pancreas, containing a mixture of proteinases and carboxypolypeptidases, to a fractionation with acetone and separating the acetone containing the proteinases in a dissolved form from the carboxypolypetidases, remaining undissolved.

8. The process which consists in subjecting an aqueous solution of pancreas-trypsin, containing a mixture of proteinases and carboxypolypeptidases to a fractionating precipitation with acetone and separating the aqueous acetone, containing the proteinases in a dissolved form, from the carboxypolypeptidases, being precipitated.

9. The process which consists in subjecting an aqueous solution of pancreas-trypsin, containing a mixture of proteinases and carboxypolypeptidases to a fractionating precipitation with normal propyl alcohol and separating the aqueous normal propyl alcohol, containing the proteinases in a dissolved form, from the carboxypolypeptidases, being precipitated.

10. The process which consists in subjecting an aqueous solution of pancreas-trypsin, containing a mixture of proteinases and carboxypolypeptidases to a fractionating precipitation with ethyl alcohol and separating the aqueous ethyl alcohol, containing the proteinases in a dissolved form, from the carboxypoly-peptidases, being precipitated.

WILHELM NEUGEBAUER.